Oct. 16, 1923.
E. BOWERS
ROLLER SKATE WHEEL
Filed Nov. 10, 1921
1,471,236
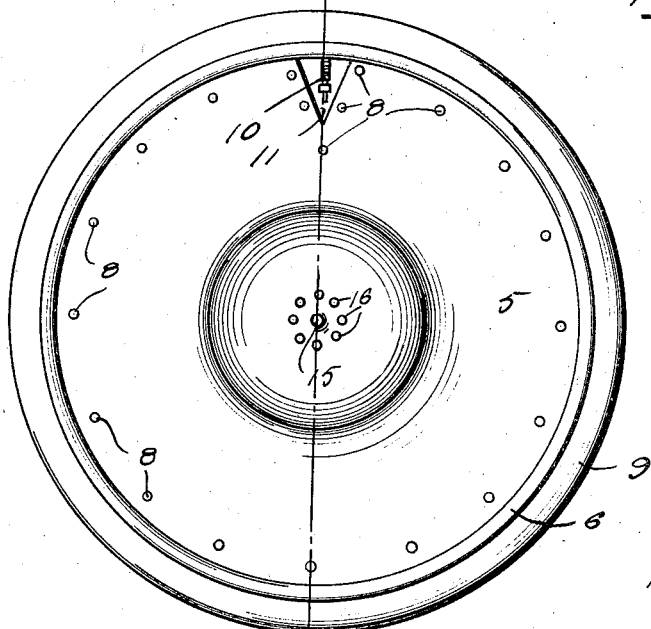
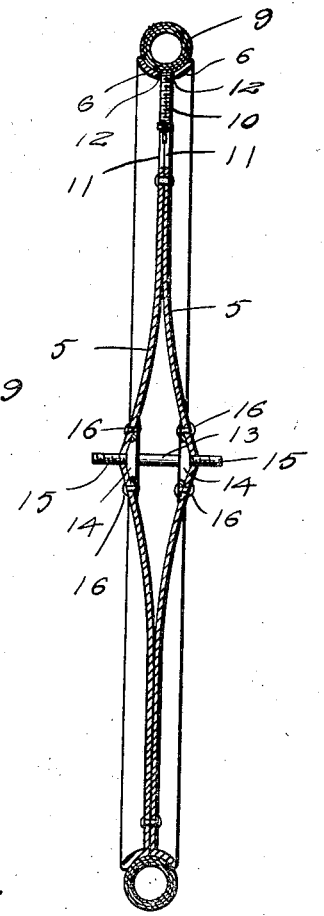
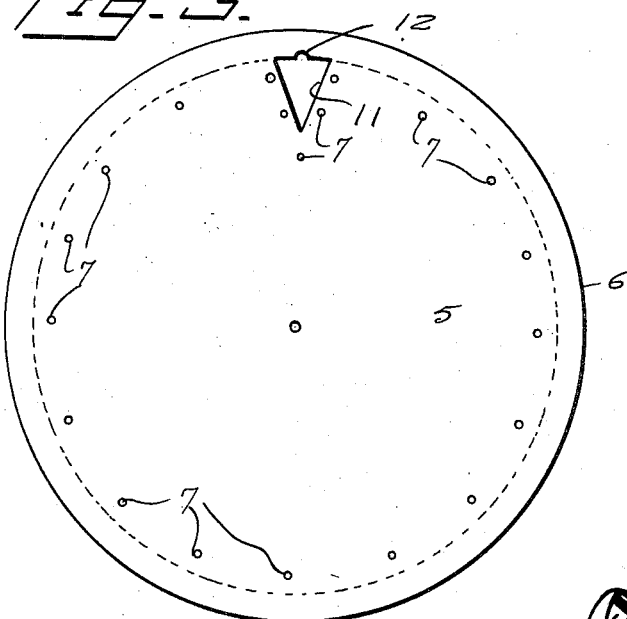
Inventor
E. Bowers
By
Attorney Patented Oct. 16, 1923.

1,471,236

UNITED STATES PATENT OFFICE.

EDWARD BOWERS, OF PADUCAH, KENTUCKY.

ROLLER-SKATE WHEEL.

Application filed November 10, 1921. Serial No. 514,257.

*To all whom it may concern:*

Be it known that I, EDWARD BOWERS, a citizen of the United States, residing at Paducah, in the county of McCracken and State of Kentucky, have invented certain new and useful Improvements in Roller-Skate Wheels; and I do hereby declare the following to be a full, clear, and exact description of the invention, such as will enable others skilled in the art to which it appertains to make and use the same.

This invention relates to a wheel particularly adapted for use on roller skates.

An important object is to provide a wheel which has main body sections which may be of sheet metal for connection in cooperative reinforced relation and has a pneumatic or resilient tire.

Another object is to provide a wheel from blanks each having an opening through a body portion substantially in the form of an arrow head to accommodate an air-inflation valve and with the blanks joined together above said openings to reinforce the same particularly at the valve-retaining opening formed through the rim portion.

A further object is to provide an axle to cooperate with such blanks spacing them at the hub in order to reinforce the wheel.

Additional objects and advantages will become apparent from a consideration of the description herein after following taken in connection with accompanying drawings illustrating one practical embodiment.

In said drawings:—

Figure 1 is a side elevation of a wheel constructed in accordance with my invention;

Figure 2 is a diametrical sectional view on the line 2—2 of Figure 1, and

Figure 3 is a plan view of the blank of the body section prior to bending or shaping thereof.

Like reference characters designate like or similar parts in the different views.

In reducing the invention to practice, two body sections or disks 5 are employed having marginal arcuate rim portions or flanges at 6. Disks 5 adjacent to the flanges 6 are provided with openings 7 through which any suitable fastening means, for instance rivets 8, may be secured. As a result, the flanges 6 form a channeled rim in which a tire 9 may be disposed, preferably removably. Said tires may be of any desired construction as for instance a solid rubber tire, or a pneumatic tire which is the type illustrated. Said tire has an air inflating valve of any suitable construction at 10.

The body sections or disks 5 are capable of being stamped each in a single piece from bendable or flexible sheet metal into a blank as seen in Figure 3. This blank may have an opening therethrough substantially the shape of an arrow-head that is comprising a triangular opening at 11 a branch opening 12, being provided in the flange 6. As a result of this construction, the openings 12 of the body sections or disk 5 are fastened together to form an opening in the rim through which the valve 10 is passed. The opening 11 forms a convenient means in which the valve is primarily disposed and gives sufficient clearance for removal of the cap and attachment and detachment of an inflating hose or other means. It will be noted that the opening 7 and rivets 8 secure the disks 5 together at the side edges of said opening 11 to reinforce the openings 11 and 12 and particularly the latter with the rim portions bridging the openings 11.

A suitable axle is provided which may have spaced disk-like abutments 14 thereon adapted to abut the inner surfaces of the disks 5 at their hubs so that said disks will be separated at their hubs to rigidify and reinforce the wheel. Extending outwardly from said axle 13 as on opposite sides of the disks 14 are screw threaded shanks 15 which extend through suitable openings at the hub of the disk 5 from a mounting or securing means.

Arranged in annular rows about the hub openings of the disk 5 are rivets or fastenings 16 which pass through the disk 5 and disks or abutments 14.

In view of the invention, a roller skate wheel has the advantages of a resilient pneumatic tire as will be understood. Due to the particular provision of the openings 11 and 12 and the adjacent rivets, the disks are not weakened as a result of their accommodation of valve 10.

As merely one practical embodiment has been illustrated and described, it is to be understood that changes in the details may be resorted to within the spirit and scope.

What is claimed is:—

A wheel having disk-like body members secured together and provided with outwardly extending annular flanges coacting to form a rim, said members being in direct contact adjacent said flanges and for a considerable distance toward the axis of the wheel, said members being deflected outwardly at said axis, an axle passing through the body members, and abutment members on the axle within the wheel overlapped by the deflected portions of said members whereby fastening of the members together will secure the axle against accidental displacement from the wheel.

In testimony whereof I affix my signature in presence of two witnesses.

EDWARD BOWERS.

Witnesses:
B. A. STATEN,
E. W. EMERY.